United States Patent [19]

Nasuta, Jr. et al.

[11] Patent Number: 5,393,939
[45] Date of Patent: Feb. 28, 1995

[54] APPARATUS AND METHOD FOR WEIGHING MOVING OBJECTS

[75] Inventors: Anthony T. Nasuta, Jr., Timonium; Dale H. Brown, Glen Burnie, both of Md.

[73] Assignee: Westinghouse Electric Corp., Pittsburgh, Pa.

[21] Appl. No.: 980,410

[22] Filed: Nov. 20, 1992

[51] Int. Cl.⁶ .................... G01G 19/00; G01G 3/14
[52] U.S. Cl. .................... 177/145; 177/210 R
[58] Field of Search .................... 177/145, 210 R

[56] References Cited

U.S. PATENT DOCUMENTS

| | | | |
|---|---|---|---|
| 4,768,600 | 9/1988 | Colvin et al. | 177/145 X |
| 4,892,162 | 1/1990 | Dolan | 177/145 X |
| 4,967,857 | 11/1990 | Kent et al. | 177/145 |
| 5,002,140 | 3/1991 | Neumuller | 177/145 X |
| 5,088,569 | 2/1992 | Checcucci | 177/145 |
| 5,215,154 | 6/1993 | Kirby | 177/136 |
| 5,230,391 | 7/1993 | Murata et al. | 177/145 X |

Primary Examiner—George H. Miller, Jr.
Attorney, Agent, or Firm—Norman A. Nixon

[57] ABSTRACT

Apparatus and method for measuring the weight of an object such as a letter, magazine or parcel, while the object is in motion, without using a weighing scale. The apparatus and method disclosed make use of moving, preferably vertically-oriented transport belts driven by a constant velocity, closed-loop feedback system which includes an electric motor. An object to be weighed is engaged and lifted upwards by the moving belts, increasing the load on the motor as a function of the weight of the object. The increased motor current evoked by the lifted object can be processed to extract the object's weight.

12 Claims, 3 Drawing Sheets

APPARATUS AND METHOD FOR WEIGHING MOVING OBJECTS

BACKGROUND OF THE INVENTION

1. Field of the Invention

The invention provides an apparatus and method of measuring the weight of an object such as a letter, magazine or parcel, while the object is in motion, without using a weighing scale.

2. Description of the Prior Art

An object is commonly weighed using some sort of weighing scale. If the object is being transported, it typically must come to rest before being weighed. This generally requires placing the object of interest on the weighing scale, pausing while the weighing system responds to the object's weight, and removing the object from the scale. The length of the intervening pause includes waiting both for the scale to react to the object's weight and for that weight to reach equilibrium.

In the aggregate, large-volume weighing operations suffer significant time penalties arising from scale response lag and from the discontinues movement associated with the weighing process. Such weighing operations can benefit from a weighing system that does not rely on static weighing scales or require static weighing scale settling, but instead weighs objects in motion.

SUMMARY OF THE INVENTION

In accordance with the invention, an apparatus and method may be provided to measure the weight of an object in motion from a first position to a second position. Generally, the invention makes use of a conveyor being driven by a constant velocity closed-loop feedback system to determine an object's weight. Within the feedback system is an electric motor. The current drawn by the electric motor is monitored to determine the motor load. The increase in current drawn by the motor is a function of the increase in load placed on the motor. As such, the weight of the object can be determined. Since weight determinations can be performed while the object is in motion, static rest and response time losses such as often seen in prior art systems can be eliminated.

In presently preferred embodiments, an object to be weighed is engaged and lifted upwards by moving belts, thus increasing the load on the motor as a function of the weight of the object. By lifting the object upwards, against gravity, no other acceleration is needed to obtain the object's weight.

The increased motor current evoked by the lifted object consists of transient and steady state values. The transient current is dependent on the initial velocity difference between the object and the belts. In some embodiments the transient value can be used. The steady state current drawn by the motor incrementally increases when the object is engaged by the belts. This incremental increase in steady state current reflects the weight of the object and can be used in some embodiments to calculate the object's weight.

Other details, objects and advantages of the invention will become apparent as the following description of a presently preferred embodiment thereof and a presently preferred method for practicing the same proceeds. In the accompanying drawings a presently preferred embodiment of the invention is shown and a presently preferred method of practicing the same is illustrated.

DESCRIPTION OF PRESENTLY PREFERRED EMBODIMENTS

Figure 1:
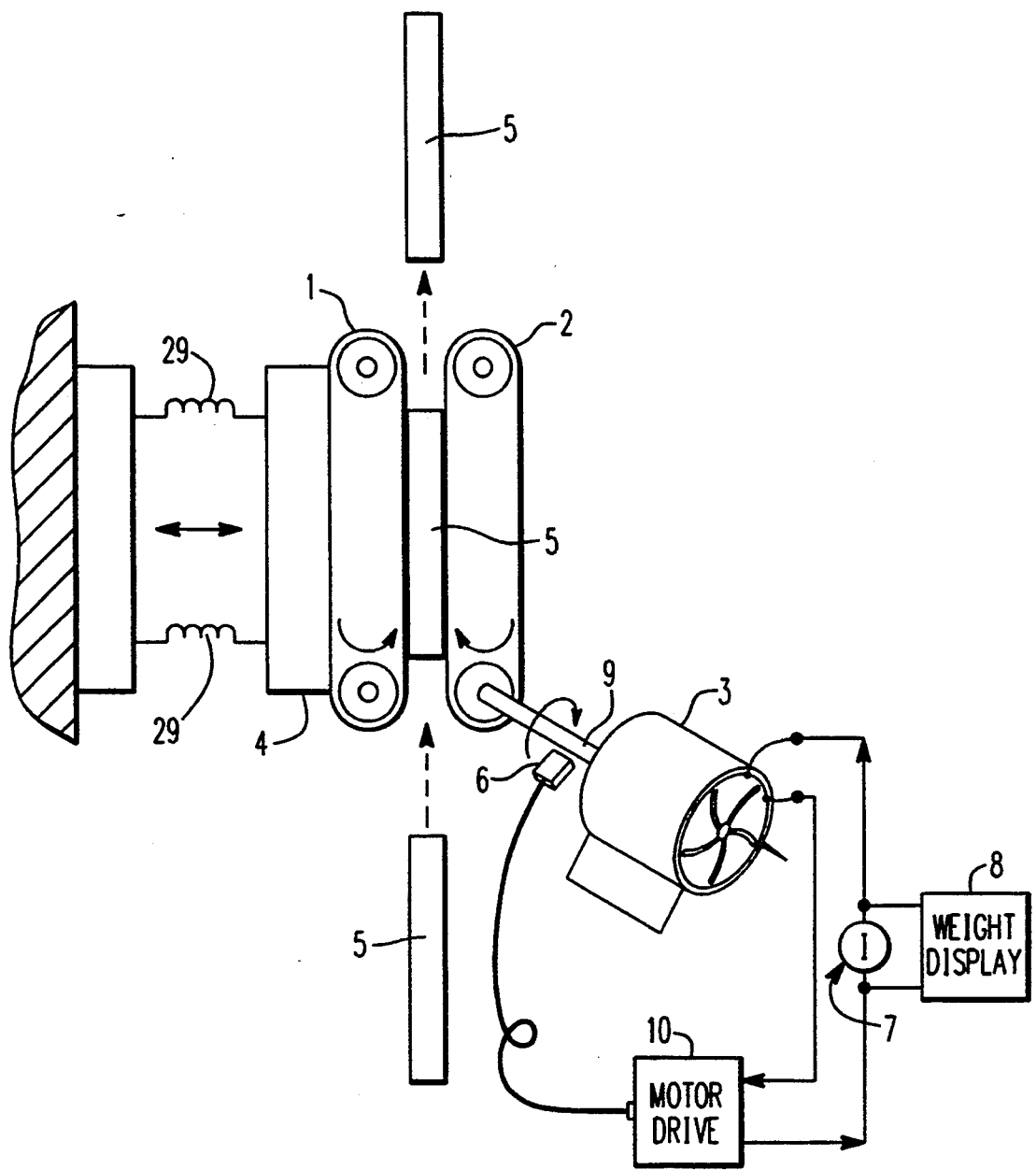
FIG. 1 is a diagrammatic representation of a presently preferred apparatus for weighing objects in vertical motion employing a closed-loop feedback arrangement.

FIG. 1 illustrates a presently preferred embodiment of an apparatus for weighing moving objects constructed in accordance with the invention. A plurality of continuous loop transport belts 1, 2 are aligned along two planes so that a face of belt 1 is in opposition to a face of belt 2. These two planes are substantially parallel and proximate with respect to each other, and parallel to the Earth's gravitational force. The belts 1, 2 are moved longitudinally along the vertical axis of the planes, so that the opposing belt faces generally travel upward. The motive force for the conveyor belt movement is preferably provided by an electric motor 3.

Confining means 4 keeps the opposing belt surfaces in varying proximity, thereby allowing belts 1, to engage and vertically transport objects of varying physical dimension. Tensioning means, such as springs 29, maintain forcible frictional contact between the object 5 and belt 1 so that object 5, in contact with belt 1, is compelled to move substantially in unison therewith. Frictional contact is also maintained between object 5 and belt 2.

Electric motor 3 is part of a closed-loop feedback system which drives belts 1, 2 at a constant velocity. The electrical motor drive current (shown measured at 7) flowing to motor 3 is indicative of the torsional load on motor 3. The velocity of belts 1, 2 is determined by using a tachometer 6 to measure the rate of revolution of motor shaft 9. To maintain a constant velocity, motor drive current transmitted by motor drive 10, increases with the increased the load on motor 3.

The transport of object 5 results in transient and steady-state components of motor drive current. Transient fluctuations in the motor drive current arise primarily from the initial loading of the transport belts 1 and 2 with object 5. The steady-state component of the drive current remains after transient oscillations have damped. For a vertical arrangement of transport belts 1, 2, which engages and propels object 5 upward, the weight of object 5 corresponds to the incremental change in the steady state component of the drive current. This increased current flow is due to the additional load imposed by the presence of object 5 between the belts 1, 2.

Electric motor drive current values are filtered using techniques to compensate for the effects of noise, slowly varying frictional torque, electrical interference and the like. The weight of object 5 engaged between the moving belts is determined from this compensated, incremental motor current value.

Motor drive current values can be transformed into object weights by solving six simultaneous Laplacian equations that describe the closed-loop feedback system in the presently preferred embodiment. Bifurcating the motor drive current value into time-domain transient and steady-state components may be accomplished using inverse Laplace transformations.

The engaged steady-state motor drive current value is sensed while object 5 is engaged by the belts 1, 2. The unengaged steady-state motor drive current value is sensed while belts 1, 2 are unengaged with object 5. The steady-state motor current difference value arises from the difference between the engaged steady-state motor drive current value and the unengaged steady-state motor drive current value. The steady-state motor current difference value is a function of, and is usually proportional to, the weight of object 5 engaged by the moving belts 1, 2. Once calculated, the weight of object 5 can be annunciated for further processing, such as creating a display 8 of the object's weight to a human operator, activating an object sorting system, and the like.

Figure 2:
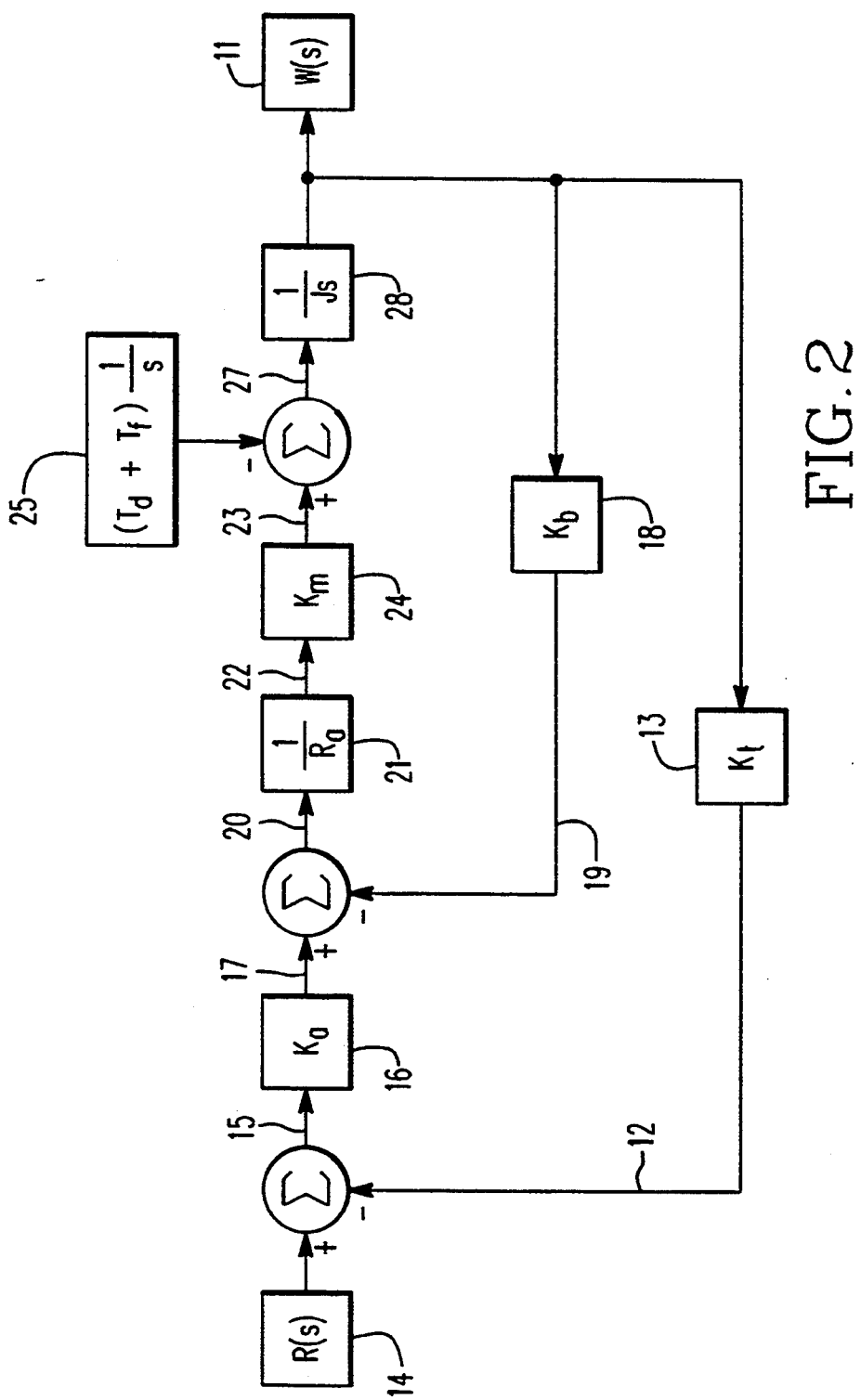
FIG. 2 is a diagrammatic representation in Laplacian (s) domain of the closed-loop feedback system, and associated variables, employed in the embodiment of FIG. 1.

FIG. 2 is a diagrammatic representation in Laplacian (s) domain of the nature and interrelation of closed-loop feedback system variables. As shown in the TABLE which follows, the Laplacian loop variables, $E_1$ through $E_6$, may be described solely in terms of the closed-loop feedback system variables, which appear in FIG. 2.

TABLE $$E_1 = \frac{K_a R_a (K_t T_f + K_t T_d) + JK_a R_a R(s)s + K_a K_b K_m R(s)}{JR_a s^2 + (K_a K_m K_t + K_b K_m)s}$$

$$E_2 = \frac{K_a (K_t T_f + K_t T_d) + K_b (T_f + T_d) + JK_a R(s)s}{JR_a s^2 + (K_a K_m K_t + K_b K_m)s}$$

$$E_3 = \frac{K_a K_m (K_t T_f + K_t T_d) + K_b K_m (T_f + T_d) + JK_a K_m R(s)s}{JR_a s^2 + (K_a K_m K_t + K_b K_m)s}$$

$$E_4 = \frac{R_a(-JT_f - JT_d) + JK_a K_m R(s)}{JR_a s + K_a K_m K_t + K_b K_m}$$

$$E_5 = \frac{R_a(-T_f - T_d) + K_a K_m R(s)}{JR_a s^2 + (K_a K_m K_t + K_b K_m)s}$$

$$E_6 = \frac{R_a(-K_t T_f - K_t T_d) + K_a K_m K_t R(s)}{JR_a s^2 + (K_a K_m K_t + K_b K_m)s}$$

where:
R (s): Reference belt velocity
$E_a(s)$: Motor drive error voltage
$K_a$: Motor drive amplifier gain
$R_a$: Motor drive armature resistance
I(S): Motor drive current
$K_m$: Motor torque constant
$T_m(s)$: Motor torque
$T_d$: Disturbance torque produced by object to be weighed
$T_l(s)$: Load torque
J: Motor inertia
$T_f$: Friction torque
W(S): Velocity of belt
$K_b$: Counter-EMF of motor
$K_t$: Tachometer constant
$v_t(s)$: Tachometer voltage Belt velocity (W(s) or $E_5$) 11 is represented through the rotation of motor shaft 9 as tachometer voltage ($E_6$) 12, which can be produced by tachometer 6. Tachometer 6 scales voltage to an appropriate range by tachometer constant ($K_t$) 13. The relationship between $E_5$ and $E_6$ is thus:

$$E_6 = E_5 K_t$$

Voltage 12 offsets belt velocity reference voltage (R(s)) 14 to produce motor drive error voltage ($E_a(s)$) 15. Voltage 15 is amplified by motor drive amplifier gain ($K_a$) 16 to produce total motor drive voltage ($E_1$) 17. The relationship between these factors is thus:

$$E_1 = K_a(R(s) - s)$$

Rotation of motor shaft 9 further represents belt velocity by the appearance of a counter electromotive force (CEMF) across the armature terminals of motor 3, as a result of the armature coils of motor 3 rotating in the magnetic field of the stator of motor 3. CEMF is generally proportional to the motor velocity. The actual CEMF 19 is reflected as the product of motor CEMF constant ($K_b$) 18 with belt velocity 11. Actual CEMF 19 offsets total motor drive voltage 17 to produce actual motor drive voltage 20, which is equal to $I_a R_a$.

Motor drive current ($E_2$) 22 may be obtained by imposing actual motor drive voltage 20 across motor transconductance 21 which is equal to the inverse of the fixed motor armature resistance, i.e., $1/R_a$. It is this motor drive current that is used to determine the transported object's weight in the presently preferred embodiment. Motor drive current 22 may be defined in terms of these variables as:

$$E_2 = \frac{E_1 - (E_5\ K_b)}{R_a}$$

Continuing in FIG. 2, motor drive current 22 generates motor torque ($E_3$) 23 of a magnitude proportional to the motor torque constant ($K_m$) 24. The external disturbances are shown as an input to the system from block 25. Specifically, disturbance torque ($T_d$) arises from, and is a function of, the weight of object 5. Friction torque ($T_f$) represents opposing torques such as that generated by the conveyor belt drive mechanism. Motor torque 23 is offset by disturbance torque 25 and friction torque 26 to result in load torque ($E_4$) 27. The factor (1/Js) in block 28 then gives the angular velocity of motor shaft 9. The factor (1/js) is derived based on the following relationships: torque is equal to the product of inertia and angular acceleration; and angular velocity is the result of integration of angular acceleration (the naplacian quantity 1/s corresponds to integration in the time domain). The rotation of motor shaft 9, in turn, represents belt velocity 11, thus completing the traversal of the several feedback loops of FIG. 2. The interrelationships among $E_3$, $E_4$, and $E_5$ and other system variables follow:

$$E_3 = E_2\ K_m$$

$$E_4 = E_3 - \frac{(T_f + T_d)}{s}$$

$$E_5 = \frac{E_4}{Js}$$

Figure 3:
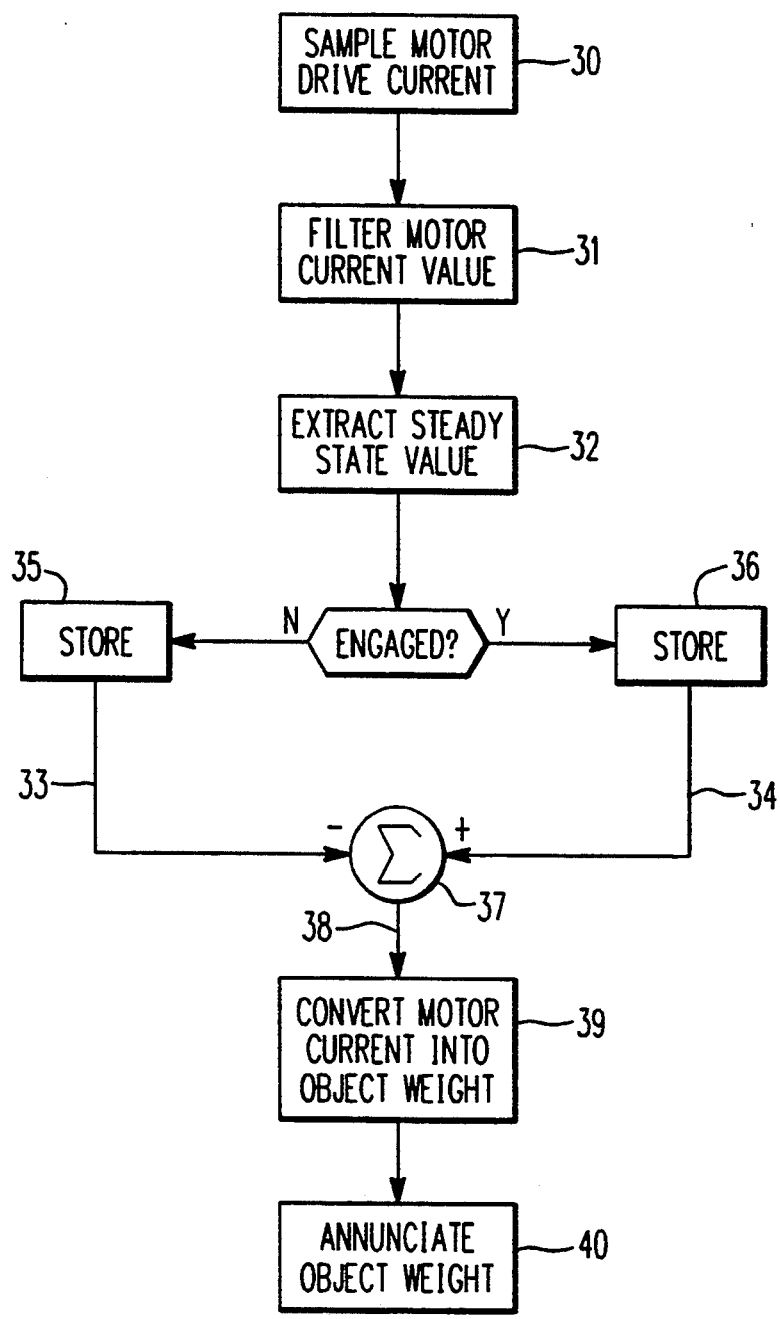
FIG. 3 is a diagrammatic representation of one algorithm which can be employed to convert electric motor drive current values into an object's weight.

In FIG. 3, sensing means 30 sense an unprocessed motor drive current sample. Filtering means 31 compensate this sample for the effects of noise, slowly varying frictional torque, electrical interference and the like.

This filtered motor drive current value consists of transient and steady-state components. Extraction means 32 extract a steady-state motor drive current value from the filtered current value.

Depending upon whether the conveyor is unengaged or engaged with object 5, the extracted steady-state value may be either an unengaged steady-state motor drive current value 33 or an engaged steady-state motor drive current value 34. The extracted value may be stored in a either an unengaged steady-state motor drive current value storage unit 35 or an engaged steady-state motor drive current value storage unit 36, respectively.

When the weight of object 5 is to be determined, the contents of storage units 35, 36 are compared in summing means 37. The result of this summation is the motor drive difference current 38 which is transformed by conversion means 39 into the weight of object 5. This weight may then be presented by annunciator means 40 for additional processing such as a display, a postage metering system, and the like.

While a presently preferred embodiment of the invention has been shown and described, and a presently preferred method of practicing the same has been illustrated, it is to be distinctly understood that the invention is not limited thereto but may be otherwise variously embodied and practiced within the scope of the following claims.

We claim:

1. An apparatus for weighing an object in transit from a first position to a second position comprising:
   (a) a conveyor operable to transport said object in contact with said conveyor from said first position to said second position;
   (b) an electric motor operatively connected to said conveyor, continuously driving said conveyor so that said object travels through said first position to said second position;
   (c) control means connected to said electric motor for operatively controlling said motor so that said object is generally transported by said conveyor at a preselected velocity during a portion of travel from said first position to said second position;
   (d) sensing means for sensing a motor drive current of said electric motor; and
   (e) processing means operatively connected to said sensing means for calculating a weight of said object based on said motor drive current.

2. The apparatus according to claim 1 wherein said conveyor is arranged substantially vertically to move said object generally parallel to gravitational force.

3. The apparatus according to claim 1 wherein said conveyor further comprises confining means for maintaining frictional engagement between said object and said conveyor.

4. The apparatus according to claim 3 wherein said confining means includes at least one pair of belts having respective opposing faces, and further includes means for varying proximity between said opposing faces, thereby allowing said pair of belts to engage and transport objects of varying physical dimensions.

5. The apparatus according to claim 3 wherein said confining means further comprises tensioning means for forcibly maintaining frictional contact between said object and said conveyor such that said object is compelled to move substantially in unison with said conveyor.

6. The apparatus according to claim 1 wherein said processing means comprises:
   (a) means for determining an engaged steady-state motor drive current value while said conveyor is:
      (i) engaged in transporting said object from said first position to said second position, and
      (ii) regulated to said preselected velocity;
   (b) means for determining an unengaged steady-state motor drive current value while said conveyor is:
      (i) not engaged in transporting said object from said first position to said second position, and
      (ii) regulated to said preselected velocity; and
   (c) summing means for calculating a motor current difference value between said engaged steady-state motor drive current value and said unengaged steady-state motor drive current value to determine said weight of said object.

7. The apparatus according to claim 1 further comprising means operatively connected to said processing means for annunciating said weight of said object.

8. A method of weighing an object in transit from a first position to a second position comprising the following steps:
   (a) transporting said object substantially vertically from said first position to said second position so as to oppose gravitational force;
   (b) compelling said transporting of said object with an electric motor;
   (c) controlling said electric motor so that said object is generally transported at a preselected velocity during a portion of travel from said first position to said second position;
   (d) sensing motor drive current of said electric motor; and
   (e) calculating a weight of said object from said motor drive current of said electric motor.

9. The method according to claim 8 wherein step (c) includes regulating said electric motor to a constant speed utilizing closed-loop feedback techniques.

10. A method according to claim 8 wherein step (a) includes:
    (f) aligning a plurality of continuous loop belts having object engaging faces along two planes wherein:
       (i) said planes are:
          (A) substantially parallel and proximate with respect to each other, and
          (B) generally parallel to gravitational force; and
       (ii) a face of one belt is generally in opposition to a face of another belt, thereby offering opposing belt faces to said object; and
    (g) moving continuously said belts longitudinally along a vertical axis of said planes, so that said opposing belt faces move generally parallel to said gravitational force.

11. The method according to claim 10 wherein step (d) includes:
    (i) sensing an unengaged steady-state motor drive current value while:
       (A) said object is unengaged with said opposing belt faces, and
       (B) said opposing belt faces are generally moving continuously at said preselected velocity; and
    (ii) sensing an engaged steady-state motor drive current value while:
       (A) said object is engaged with said opposing belt faces, and
       (B) said opposing belt faces are generally moving continuously at said preselected velocity;
   and further wherein step (e) includes:

(i) determining a motor current difference value between said unengaged steady-state motor drive current value and said engaged steady-state motor drive current value; and
(ii) calculating said weight of said object from said motor current difference value.

12. The method according to claim 10 wherein step (a) further includes:
(h) maintaining in variable proximity said opposing belt faces so that an object of variable thickness interposed between said belt faces is frictionally engaged therebetween.

* * * * *